United States Patent
Di Maggio et al.

(10) Patent No.: US 12,529,181 B2
(45) Date of Patent: Jan. 20, 2026

(54) MIXING APPARATUS FOR INTERMIXING AN ADDITIVE WITH A LIQUID IN A WASHING MACHINE, WASHING MACHINE AND METHOD

(71) Applicant: E.G.O. Elektro-Gerätebau GmbH, Oberderdingen (DE)

(72) Inventors: Antonio Di Maggio, Schwaigern (DE);
Uwe Schaumann, Oberderdingen (DE);
Arnd Kessler, Monheim/Rhein (DE);
Ingo Hardacker, Hamminkeln (DE)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 106 days.

(21) Appl. No.: 18/415,757

(22) Filed: Jan. 18, 2024

(65) Prior Publication Data
US 2024/0279865 A1 Aug. 22, 2024

(30) Foreign Application Priority Data

Feb. 16, 2023 (DE) ...................... 10 2023 201 351.7

(51) Int. Cl.
*D06F 39/02* (2006.01)
*D06F 39/08* (2006.01)
(Continued)

(52) U.S. Cl.
CPC .......... *D06F 39/022* (2013.01); *D06F 39/088* (2013.01); *F16K 11/105* (2013.01); *D06F 2105/42* (2020.02)

(58) Field of Classification Search
CPC .................................................. D06F 39/022
See application file for complete search history.

(56) References Cited

U.S. PATENT DOCUMENTS

| 11,203,831 B2 | 12/2021 | Dunsbergen et al. |
| 11,739,462 B2 | 8/2023 | Ko et al. |
| 2015/0238066 A1 | 8/2015 | Wang et al. |

FOREIGN PATENT DOCUMENTS

| CN | 106637832 A | 5/2017 |
| CN | 106702680 A | 5/2017 |

(Continued)

OTHER PUBLICATIONS

German Patent and Trademark Office, Office Action received for Application No. 102023201351.7, dated Aug. 28, 2023, 16 pages, Germany.

(Continued)

*Primary Examiner* — Jason Y Ko
(74) *Attorney, Agent, or Firm* — Alston & Bird LLP

(57) ABSTRACT

The invention relates to a mixing apparatus (1) with a main line (3), in which a liquid (F) flows along a direction of flow (FR), and a secondary line (9). The main line (3) has an inlet (4), an outlet (5) for discharging the liquid (F) conducted through the main line (3), and a three-way valve (8) at a beginning (6) and at an end (7). The secondary line (9) is connected via the three-way valves (8) to the main line (3) and, together with the main line (3), forms a mixing circuit (MKL). The liquid (F) can be pumped with a pump (11) through the main line (3) and through the secondary line (9) in the mixing circuit (MKL). In addition, at least one additive inlet opening (26) is provided on the main line (3) for adding an additive into a mixing zone (M) of the main line (3). The mixing apparatus (1) furthermore has at least one swirling means (13) in the main line (3). The invention moreover relates to a washing machine having such a mixing apparatus (1) and to a method for intermixing an additive with a liquid (F).

24 Claims, 7 Drawing Sheets

(51) Int. Cl.
*F16K 11/10* (2006.01)
*D06F 105/42* (2020.01)

(56) References Cited

FOREIGN PATENT DOCUMENTS

| | | |
|---|---|---|
| CN | 210287842 U | 4/2020 |
| DE | 102016106777 A1 | 10/2017 |
| GB | 2314091 A | 12/1997 |
| JP | 07-068082 A | 3/1995 |
| KR | 10-2010-0082481 A | 7/2010 |
| WO | WO 02/058833 A2 | 8/2002 |

OTHER PUBLICATIONS

Extended European Search Report Mailed on Jun. 27, 2024 for EP Application No. 24151075, 14 page(s).

MIXING APPARATUS FOR INTERMIXING AN ADDITIVE WITH A LIQUID IN A WASHING MACHINE, WASHING MACHINE AND METHOD

CROSS-REFERENCE TO RELATED APPLICATIONS

This application claims priority to German Application No. 10 2023 201 351.7, filed Feb. 16, 2023, the contents of which are hereby incorporated herein in its entirety by reference.

FIELD OF APPLICATION AND PRIOR ART

The invention relates to a mixing apparatus for intermixing an additive with a liquid in a washing machine and to a washing machine having such a mixing apparatus. The invention further relates to a method for intermixing an additive with a liquid using such a mixing apparatus or using such a washing machine.

DE 10 2016 106 777 A1 discloses an automatic washing machine having a drum for receiving laundry, wherein the automatic washing machine has a receiving portion for receiving a plurality of additives and a dispensing means for dispensing at least one additive from the receiving portion into the drum. The automatic washing machine also has a mixing chamber for mixing additives, wherein the mixing chamber is fluidically connected to the receiving portion and the drum.

U.S. Pat. No. 11,739,462 B2 discloses a washing machine having a laundry detergent supply unit which has a laundry detergent dispenser for receiving laundry detergent and a laundry detergent mixing tank which is configured to mix a portion of the laundry detergent with washing water. The washing machine is configured such that water mixed with laundry detergent, which has been mixed in the laundry detergent mixing tank, is discharged through a mixing water hose via a laundry detergent tank into a drum of the washing machine.

OBJECT AND ACHIEVEMENT THEREOF

The object of the present invention is to provide a mixing apparatus, a washing machine equipped therewith and a method which offer advantages over the prior art, in particular with regard to structure, automation, washing performance, functionality and/or resource efficiency.

This object is achieved by a mixing apparatus having the features of claim 1, by a washing machine having the features of claim 19 and by a method having the features of claim 22. Advantageous and preferred embodiments of the invention are the subject matter of further claims and are explained in greater detail below. Some features are described only for the mixing apparatus, only for the washing machine or only for the method. Regardless of this, however, they are intended to be applicable separately and mutually independently both to a mixing apparatus and also to a washing machine and to a method. The wording of the claims is incorporated by express reference into the content of the description.

The mixing apparatus according to the invention for intermixing an additive with a liquid, preferably water, in a washing machine has a main line in which the liquid flows along a direction of flow. The additives may be, in particular liquid, laundry detergent or parts of laundry detergents. The main line has an inlet and an outlet for discharging the liquid conducted through the main line, as well as a three-way valve at a beginning and at an end. The mixing apparatus also has a secondary line which is connected at each end via the three-way valves to the main line and so forms a mixing circuit, and a pump with which the liquid can be pumped through the main line and through the secondary line in the mixing circuit. In addition, the mixing apparatus has at least one additive inlet opening on the main line for adding an additive into a mixing zone of the main line and at least one swirling means in the main line. A dispensing apparatus is preferably connected to the additive inlet opening. Such a dispensing apparatus can be used to store and supply different additives separately, for example due to incompatibilities between them. This additionally enables defined quantities of additives to be supplied to the mixing apparatus and thus into the washing machine drum.

The main line in particular has a length of at most 80 cm, preferably of at most 40 cm, and/or of at least 10 cm, preferably of at least 15 cm. The length and also the route of the main line can be adapted to the available installation space.

Such a mixing apparatus according to the invention makes it possible to optimize intermixing of washing substances or additives with the liquid, whereby the washing performance of the washing machine is improved. In addition, the mixing apparatus makes it possible to provide an adapted mixing process irrespective of the ongoing washing process and to control disruptive variables, such as for example foaming, by the avoidance of air in the mixing apparatus. The swirling means of the mixing apparatus, on the one hand, result in better intermixing and, on the other hand, avoid segregation of the additives. Shear forces are used in targeted manner for this purpose. The mixing apparatus may take the form of a prefabricated module which can be straightforwardly installed in a washing machine. In particular, the compact design of the mixing apparatus means that it can be installed or retrofitted, for example, in or instead of the drawer or laundry detergent container in the upper part of existing washing machines. In this case, the mixing apparatus is inserted into the existing installation space, wherein no major structural changes to the washing machine are necessary. This not only enables easier installation during the washing machine production process but also easy access for servicing and repair.

In a further development of the invention, the at least one swirling means is arranged between the at least one additive inlet opening and the pump. This constitutes a structurally and functionally advantageous implementation for the design and function of the mixing apparatus. The pump can be controlled such that swirling occurs within the mixing apparatus. The at least one swirling means is preferably arranged in the mixing zone of the main line.

In a further development of the invention, a distance between the at least one additive inlet opening and the at least one swirling means is less than 10 cm. This has an advantageous effect on the intermixing of additives, in particular in the case of high-viscosity additives, such as for example high-viscosity surfactant concentrations. The distance between the at least one additive inlet opening and the at least one swirling means is preferably less than 5 cm or less than 2 cm.

In a further development of the invention, the at least one swirling means is a change in an internal diameter and/or a flow cross-sectional area of the main line. By changing the geometry of the main line, the shear forces required for intermixing are achieved in the mixing zone. As a result of fluid velocity, swirling occurs at the transitions of the inner contour. This region may also be denoted swirl zone. In the swirl zone, the additives supplied through the additive inlet opening are subjected to different shear forces depending on the volumetric flow rate. The flow cross-sectional area of the main line preferably becomes larger along the direction of flow, wherein in particular the flow cross-sectional area first becomes larger and then smaller again. The internal diameter and/or flow cross-sectional area of the main line changes, preferably in stages. The main line preferably has a conical shape as swirling means.

In one development of the invention, a plurality of changes in internal diameter and/or flow cross-sectional area of the main line are arranged one behind the other along the direction of flow. This constitutes a structurally and functionally advantageous implementation of the mixing apparatus in that the concatenation of a plurality of swirling means further optimizes intermixing in the mixing apparatus. In addition, the adhesion of soiling in the main line can also be reduced. The plurality of changes in internal diameter or flow cross-sectional area of the main line are preferably of the same type.

In a further development of the invention, the at least one swirling means is a rotor which is arranged on the pump. This is a structurally and functionally advantageous implementation of the mixing apparatus since the rotor further improves the intermixing of additives, in particular of high-viscosity additives. The rotor is preferably arranged on a rotary shaft of the pump bearing a pump rotor or an impeller for driving the rotor. The rotor is preferably arranged at a small distance from the additive inlet opening. The pump can also be used to control the strength of the shear forces in a reverse direction of flow.

In a further development of the invention, a plurality of additive inlet openings are arranged on the main line in the mixing zone. This makes it possible to deliver a plurality of different additives spatially separately into the main line without their influencing one another. The plurality of additive inlet openings are preferably arranged offset relative to one another in a circumferential direction and/or along the direction of flow.

In a further development of the invention, the mixing apparatus is connected to a fresh water line. This is a structurally and functionally advantageous implementation of the mixing apparatus, whereby the volume of fresh water is controllable and thus resource efficiency is optimized. The fresh water line is preferably located directly adjacent to the mixing circuit.

In a further development of the invention, the main line is modifiable in shape in the mixing zone. This is a structurally and functionally advantageous implementation of the mixing apparatus, whereby the main line can have its shape modified in such a way that it does not have a rectilinear shape and consequently corresponding regions with turbulent flow are obtained. The main line in the mixing zone can preferably be deformed by way of actuators, wherein the main line in particular takes the form of a flexible hose and the actuators are configured to bend the main line and/or to modify a cross-section of the main line.

In a further development of the invention, the pump is a main pump for the water routing system in the washing machine. In other words, the mixing apparatus does not require a separate, additional pump, but when installed in the washing machine instead makes use of the main pump already present in the washing machine. This applies in particular when the mixing apparatus is installed in a lower part of the washing machine below a drum.

In a further development of the invention, the pump is an auxiliary pump for the mixing circuit of the mixing apparatus. In other words, the pump of the mixing apparatus is a separate, additional pump to the pump already present in the washing machine. The auxiliary pump is in particular provided when the mixing apparatus is installed in an upper part of the washing machine above a drum, wherein the washing machine has a further main pump for the water routing system in the washing machine.

In one development of the invention, the pump is set up to change the direction of flow in the mixing circuit. Changing the direction of flow in the mixing circuit enables circulation, whereby intermixing in the mixing apparatus is further improved.

In a further development of the invention, the mixing apparatus has a heating and/or cooling means for heating and cooling the liquid in the main line. This is a structurally and functionally advantageous implementation of the mixing apparatus in that the heating and/or cooling means improves the intermixing and application of additives, in particular by adjusting the temperature in coordination with the temperature of the washing drum. In this way, the mixing apparatus can provide defined conditions, i.e., a defined temperature, for mixing. The heating and/or cooling means preferably has a Peltier element and is located directly adjacent to the main line, in particular immediately adjacent to the additive inlet opening of the supplied additive.

In a further development of the invention, the mixing apparatus has at least one additional liquid tank which can be connected to and disconnected from the mixing circuit via at least one valve. In this way, it is possible to flexibly adjust a volume of the mixing circuit or the washing liquid to the washing process, wherein the necessary volume for application onto the laundry differs for example depending on load quantity and type of textile. The at least one additional liquid tank is preferably arranged in a further line parallel to the main line and the secondary line. If there are a plurality of additional liquid tanks, they can be connected and disconnected independently of one another. A volume of the mixing circuit can be from 0.051 to 21, preferably from 0.21 to 11.

The temperature and/or volume of liquid or washing liquid in the mixing circuit may be adapted to the respective characteristics of the additives and/or to a washing program.

The washing machine according to the invention has a rotatable drum with a water-permeable wall together with a drum drive for rotating it, and a drum receptacle in which the drum is arranged, wherein the drum receptacle encloses the drum. The washing machine has a feeding apparatus for introducing water into the drum onto laundry located therein, a pump and water lines in order to pump water to the feeding apparatus. A heating means for heating water is also provided, wherein the heating means is connected to the pump in fluid-conducting manner. The washing machine further has a dispensing apparatus for adding additives and the above-described mixing apparatus according to the invention, wherein the mixing apparatus is arranged in fluidically connected manner between the dispensing apparatus and the feeding apparatus on the one hand and between a water supply and the feeding apparatus on the other hand. This water supply may be for example a fresh water supply or a water supply originating from the washing drum. The washing machine further has a washing machine controller which is connected to the pump, the heating means and the drum drive as well as to the mixing apparatus and the dispensing apparatus. This enables automated intermixing of additives with the liquid in the mixing apparatus.

In a further development of the invention, the mixing apparatus is arranged in an upper part of the washing machine above the drum. This is a structurally and functionally advantageous implementation of the washing machine since access for servicing and repair is facilitated in embodiments with a mixing apparatus in the upper part of the washing machine. The mixing apparatus is preferably connected to a DC power supply.

In a further development of the invention, the mixing apparatus is arranged in a lower part of the washing machine below the drum. The mixing apparatus is preferably connected to an AC power supply.

The inventive method for intermixing an additive with a liquid is carried out using the above-described mixing apparatus according to the invention or using the above-described washing machine according to the invention.

In a further development of the invention, the liquid with at least one added additive is pumped repeatedly through the mixing circuit. On the one hand, this enables better intermixing of the additives in the liquid and, on the other hand, avoids segregation thereof. The mixing circuit is preferably self-contained. The direction of flow in the mixing circuit can be reversed.

In a further development of the invention, the volume of the liquid mixed with additive is increased by at least one additional liquid tank. The additional liquid from the at least one additional liquid tank is mixed with additive in the mixing circuit. This makes it possible to introduce an increased volume of liquid mixed with additive into the drum, which increases flexibility for application depending on the selected program or load quantity.

In a further development of the invention, a temperature in the mixing circuit is adjusted by way of the above-described heating and/or cooling means to a temperature appropriate to the particular additives. This makes it possible to provide defined conditions for the washing liquid. The temperature in the mixing circuit is preferably monitored by way of a temperature sensor which is arranged in particular on the pump or close to the additive inlet opening.

These and further features are revealed in the description and in the drawings as well as in the claims, wherein the individual features can each be realized singly or severally in the form of sub-combinations in one embodiment of the invention and in other fields, and can represent embodiments advantageous and protectable per se, for which protection is claimed here. The subdivision of the application into individual sections and sub-headings does not limit the general validity of the statements made thereunder.

BRIEF DESCRIPTION OF THE DRAWINGS

The drawings illustrate advantageous embodiments of the invention. These and further embodiments of the invention are explained in greater detail below. In the figures:

FIG. 11 is a schematic representation of a mixing apparatus according to FIG. 3, wherein two additional liquid tanks are provided which can be connected to and disconnected from the mixing circuit via at least one valve, FIG. 12 is a schematic representation of a mixing apparatus according to FIG. 3, wherein, on the outlet side, the main line joins a fresh water line and opens into a feeding apparatus.

DETAILED DESCRIPTION OF THE EXEMPLARY EMBODIMENTS

Figure 1:
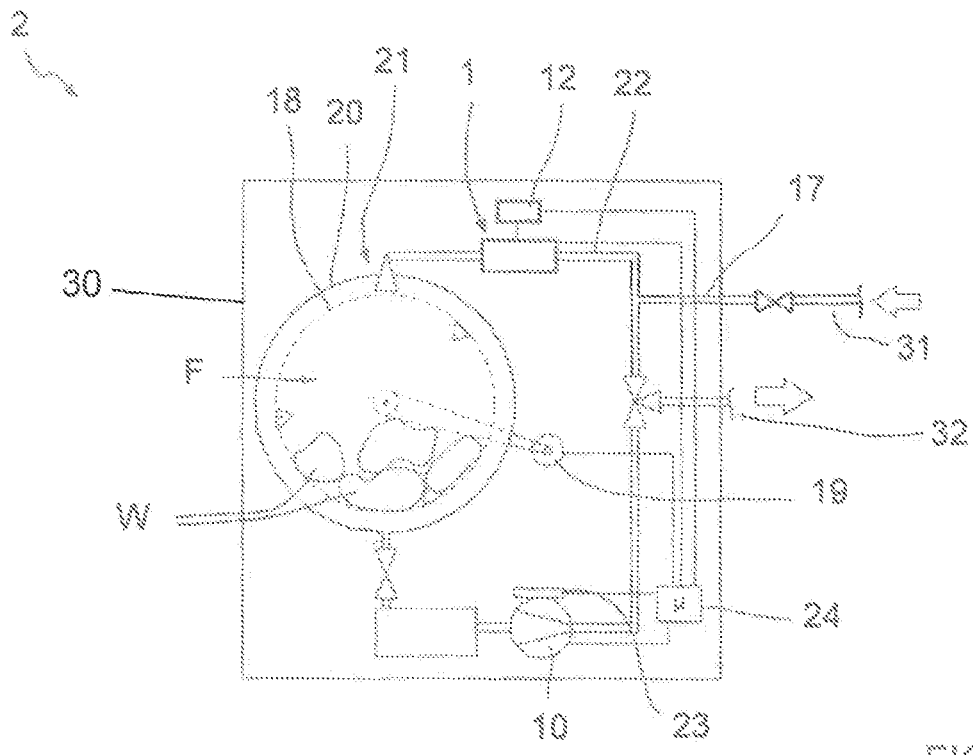
FIG. 1 is a schematic representation of a washing machine according to the invention with a mixing apparatus according to the invention in the upper part of the washing machine.
Figure 2:
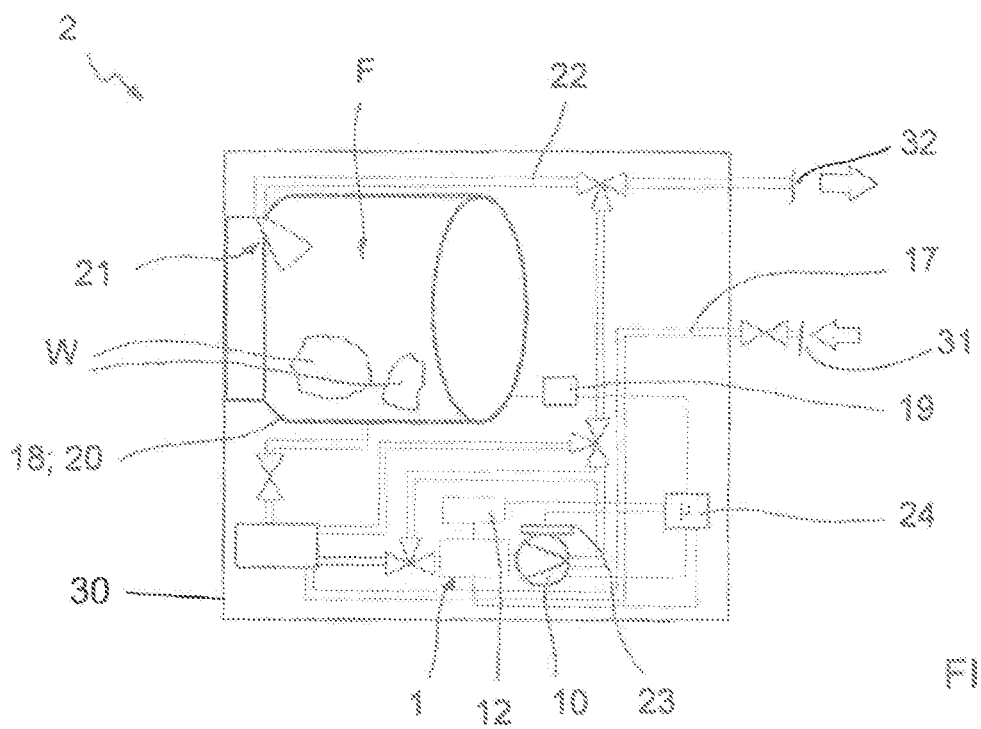
FIG. 2 is a schematic representation of a washing machine according to the invention with a mixing apparatus according to the invention in the lower part of the washing machine.

As illustrated in FIGS. 1 and 2 on the basis of two exemplary embodiments, the washing machine 2 according to the invention includes the mixing apparatus 1 according to the invention for intermixing an additive with a liquid F in the washing machine 2 and, in the embodiments shown, a housing 30, a fresh water connection 31 and a waste water connection 32. The washing machine 2 has a rotatable drum 18 with a water-permeable wall together with a drum drive 19 for rotating it and a drum receptacle 20 in which the drum 18 is arranged, wherein the drum receptacle 20 encloses the drum 18, as is apparent in particular in FIG. 1. The washing machine 2 further has a feeding apparatus 21 for introducing water into the drum 18 onto laundry W located therein, and a pump 10 and water lines 22 for pumping water to the adm feeding ission apparatus 21. A heating means 23 for heating water, wherein the heating means 23 is connected in fluid-conducting manner to the pump 10, a dispensing apparatus 12 for adding additives and a washing machine controller 24 are additionally provided, the latter being connected to the pump 10, the heating means 23, the drum drive 19 and the dispensing apparatus 12 and mixing apparatus 1. The mixing apparatus 1 is fluidically connected between the dispensing apparatus 12 and the feeding apparatus 21 on the one hand and between a water supply, such as for example a fresh water line 17, and the feeding apparatus 21, as is apparent in FIGS. 1 and 2. This water supply may correspond both to the fresh water connection 31 and to a water supply originating from the washing drum 18.

In the embodiments shown, the dispensing apparatus 12 is designed for liquid laundry detergents or liquid components of laundry detergents, wherein these different additives are stored separately from one another. The dispensing apparatus 12 enables the supply of defined quantities of additives into the mixing apparatus 1 and thus into the washing drum 18 of the washing machine 2.

In a structurally advantageous embodiment of the washing machine 2, the mixing apparatus 1 is arranged in an upper part of the washing machine 2 above the drum 1, as shown in FIG. 1. The mixing apparatus 1 is preferably connected to a DC power supply which is not shown in the figures. This is done here for safety reasons, also because an operating means arranged at the top is supplied with DC.

In an alternative embodiment of the washing machine 2, the mixing apparatus 1 is arranged in a lower part of the washing machine 2 below the drum 18, as shown in FIG. 2. The mixing apparatus 1 is preferably connected to an AC power supply which is not shown in the figures, since the drive motor and power supply therefor, which are arranged below, as well as the pump are supplied with AC.

The mixing apparatus 1 according to the invention has a main line 3, in which the liquid F flows along a direction of flow FR, and a secondary line 9. The main line 3 has an inlet 4, an outlet 5 for discharging the liquid F conducted through the main line 3, and a three-way valve 8 at a beginning 6 and at an end 7. The secondary line 9 is connected at both ends via the three-way valves 8 to the main line 3 and, together with the main line 3, forms a mixing circuit MKL, as shown in FIGS. 3 to 6. The mixing apparatus 1 further has a pump 11, with which the liquid F can be pumped through the main line 3 and through the secondary line 9 in the mixing circuit MKL. In addition, at least one additive inlet opening 26 is provided on the main line 3 for adding an additive into a mixing zone M of the main line 3. A dispensing apparatus 12 is preferably connected to the additive inlet opening 26, as shown in FIGS. 3 to 6. The mixing apparatus 1 furthermore has at least one swirling means 13 in the main line 3.

In a structurally advantageous embodiment, the main line 3 has a length of at least 10 cm, preferably of at least 15 cm, and a length of at most 80 cm, preferably of at most 40 cm. The length and also the route of the main line 3 are preferably adapted to the available installation space, which is also determined inter alia by the size of the dispensing apparatus 12.

In one advantageous implementation, the at least one swirling means 13 is arranged between the at least one additive inlet opening 26 and the pump 11. The pump 11 can be controlled such that swirling occurs within the mixing apparatus 1. The at least one swirling means 13 is preferably arranged in the mixing zone M, as shown in FIGS. 6 to 10.

In advantageous embodiments, a distance between the at least one additive inlet opening 26 and the at least one swirling means 13 is less than 10 cm. The distance between the at least one additive inlet opening 26 and the at least one swirling means 13 is preferably less than 5 cm or less than 2 cm. In the embodiments shown according to FIGS. 6 to 8, the additive inlet opening 26 is located immediately adjacent to the swirling means 13.

Figure 6:
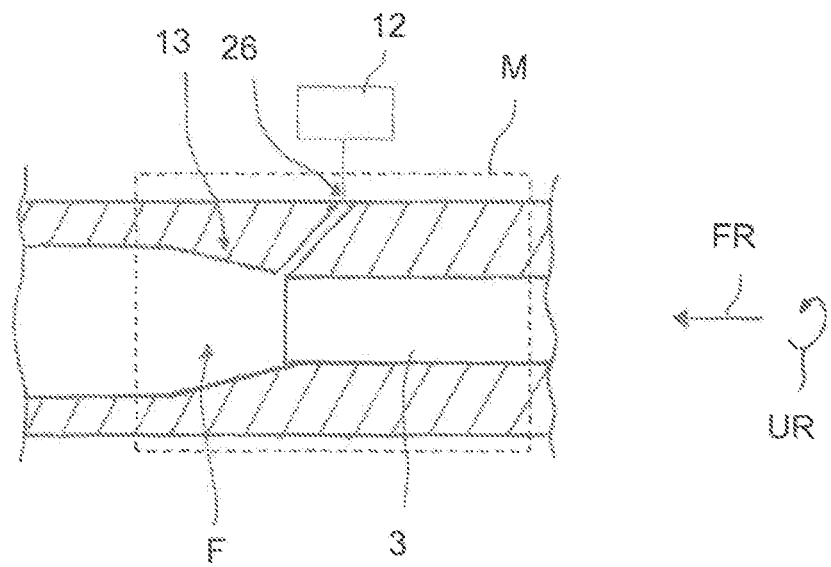
FIG. 6 is a schematic representation of a mixing zone in the main line of a mixing apparatus according to the invention, wherein a swirling means is provided in the form of an enlargement in flow cross-sectional area.
Figure 7:
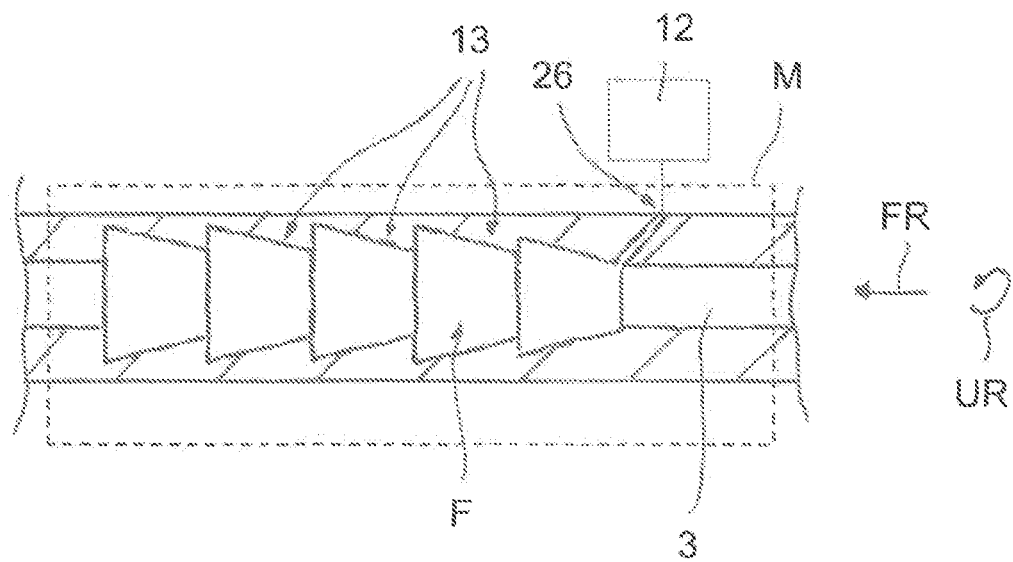
FIG. 7 is a schematic representation of a mixing zone according to FIG. 6, wherein a plurality of swirling means in the form of an enlargement in flow cross-sectional area are arranged one behind the other.
Figure 8:
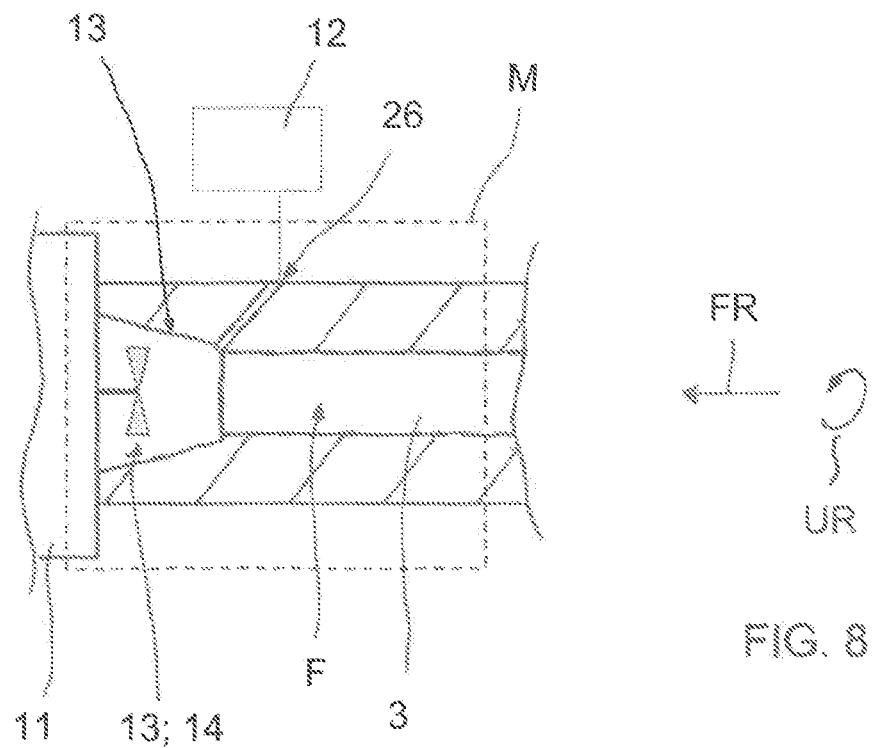
FIG. 8 is a schematic representation of a mixing zone according to FIG. 6, wherein the enlargement in flow cross-sectional area is located adjacent to the pump on which a rotor is arranged as further swirling means.

In a structurally advantageous embodiment, the at least one swirling means 13 is a change in an internal diameter DH and/or a flow cross-sectional area AH of the main line 3, as shown in FIGS. 6 to 8. The shear forces required for intermixing are achieved in the mixing zone M by the swirling means 13 in the main line 3. The fluid velocity in the main line 3 gives rise to the desired swirling at the transitions of the internal contour. The flow cross-sectional area AH of such a swirling means 13 preferably becomes larger along the direction of flow FR, as shown in FIG. 6. In particular, the flow cross-sectional area AH becomes first larger and then smaller again, as shown in FIG. 7 for a plurality of concatenated swirling means 13. The change in internal diameter DH and/or flow cross-sectional area AH of the main line 3 is preferably conical.

In one advantageous implementation, the plurality of swirling means 13 or plurality of changes in internal diameter DH and/or flow cross-sectional area AH of the main line 3 are arranged one behind the other along the direction of flow FR, as shown in particular in FIG. 7. In the embodiment shown in FIG. 7, five such swirling means 13 are arranged one behind the other. In embodiments which are not shown, just two, three, four or more than five such swirling means 13 may be arranged one behind the other. The plurality of changes are preferably of the same type.

In a structurally advantageous embodiment, the at least one swirling means 13 is a rotor 14 which is arranged on the pump 11, as shown in FIG. 8. The rotor 14 is preferably arranged on a rotary shaft of the pump 11 bearing a pump rotor or an impeller for driving the rotor 14. The rotor 14 is advantageous in particular when high-viscosity additives are used.

In the embodiment shown in FIG. 8, the mixing apparatus 1 has two different swirling means 13, specifically on the one hand in the form of the rotor 14 and on the other hand in the form of the above-stated change in flow cross-sectional area AH of the main line 3.

In advantageous embodiments, a plurality of the additive inlet openings 6 are arranged on the main line 3 in the mixing zone M. In one embodiment which is not shown, the plurality of additive inlet openings 6 are preferably arranged offset relative to one another in a circumferential direction UR and/or along the direction of flow FR, such that the various additives do not influence one another.

Figure 13:
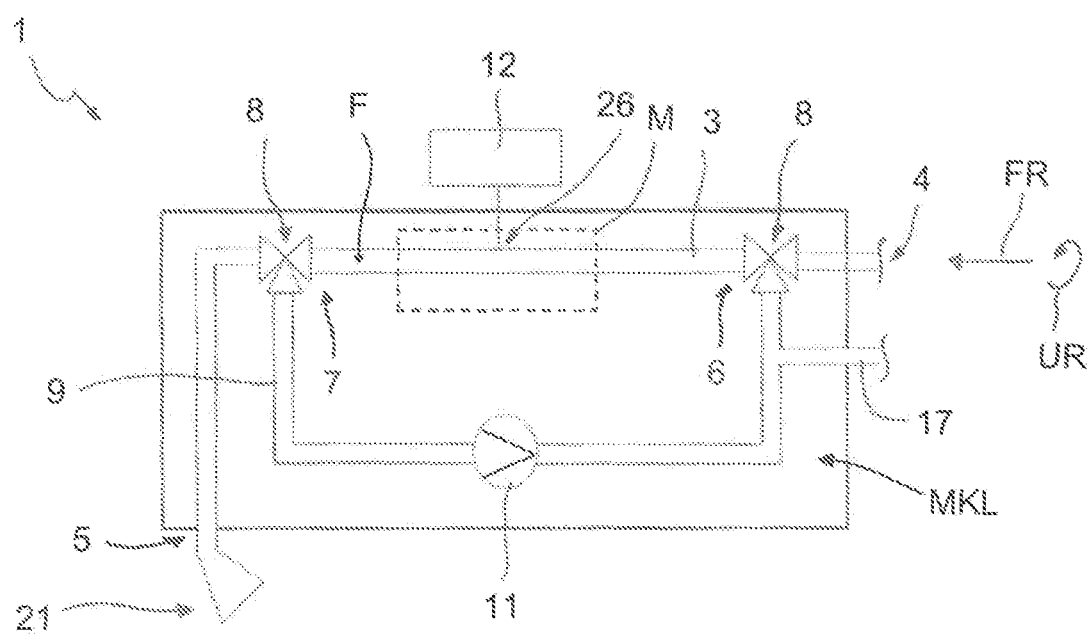
FIG. 13 is a schematic representation of the mixing apparatus of FIG. 12, wherein the fresh water line is connected to the secondary line and is thus located directly adjacent to the mixing circuit of the mixing apparatus.

In one structurally advantageous embodiment, the mixing apparatus 1 is connected to a fresh water line 17. The fresh water line 17 is preferably located directly adjacent to the mixing circuit MKL, as shown in FIG. 13. In the embodiment shown, the fresh water line 17 is fluidically connected to the secondary line 9. The fresh water line 17 is connected to the secondary line 9 via a valve which is not shown in the figures.

Figure 9:
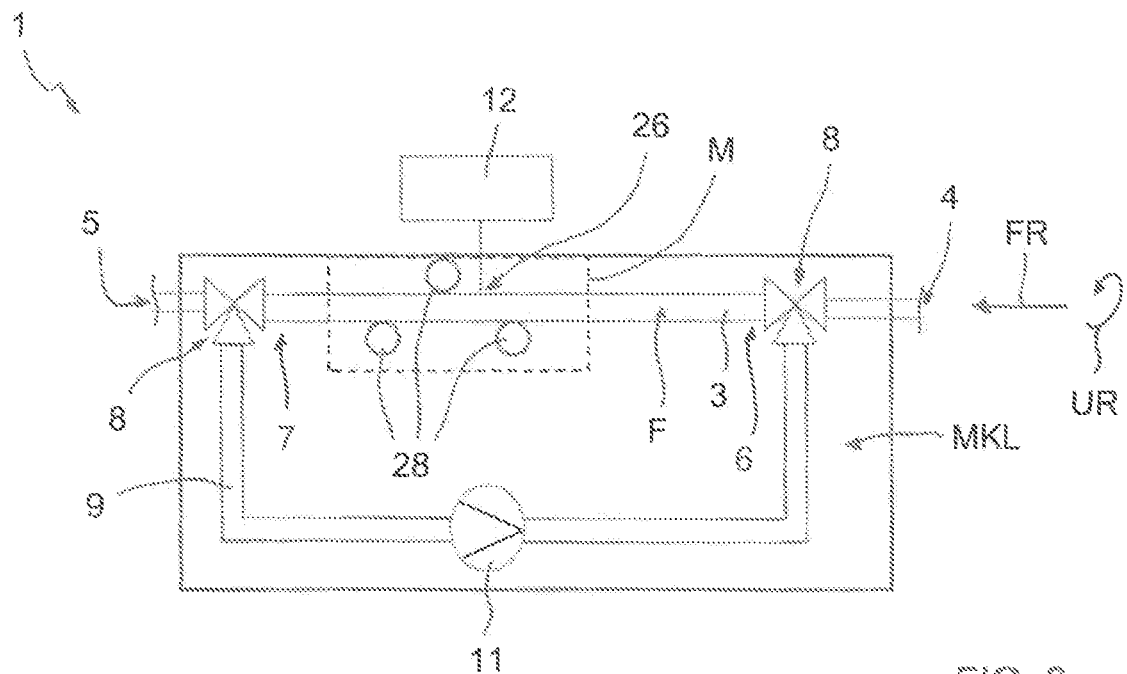
FIG. 9 is a schematic representation of a mixing apparatus according to FIG. 3, wherein the main line is modifiable in shape in a mixing zone and can be deformed by way of actuators, wherein the main line has not been modified in shape.
Figure 10:
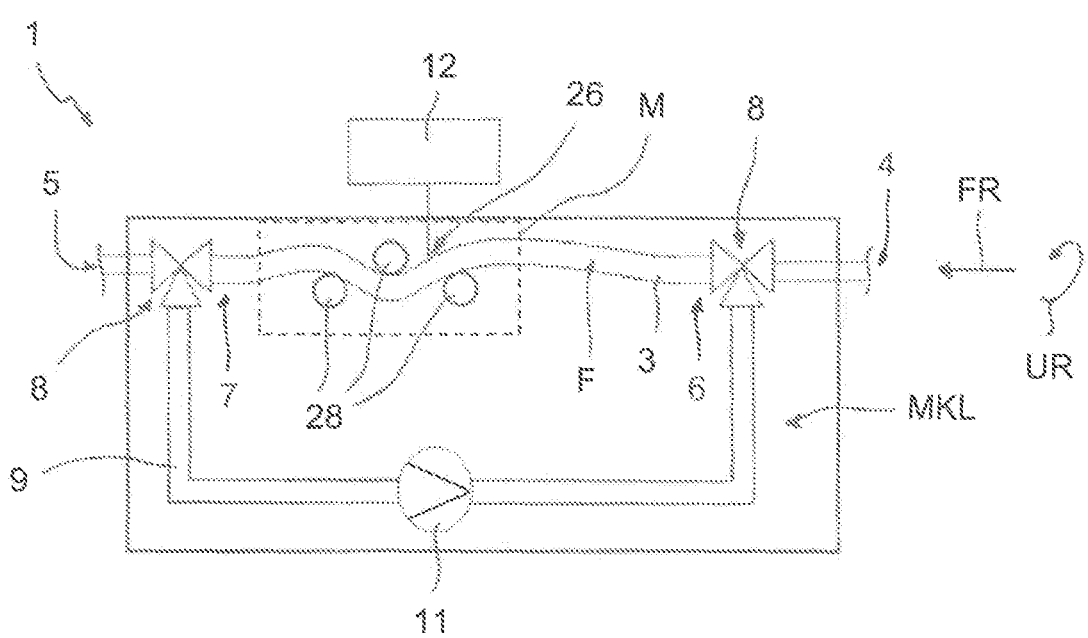
FIG. 10 is a schematic representation of the mixing apparatus of FIG. 9, wherein the main line has been deformed in the mixing zone by way of the actuators.

In advantageous embodiments, the main line 3 is modifiable in shape in the mixing zone M. The main line 3 may preferably be deformed by way of actuators 28, as shown in FIGS. 9 and 10. FIG. 9 shows the main line 3 in the mixing zone M in an unmodified rectilinear shape, whereas the main line 3 is deformed in a serpentine manner in FIG. 10. This results in swirling in this region. In particular, the main line 3 takes the form of a flexible hose and the actuators 28 are configured to bend the main line 3 and/or to modify a cross-section of the main line 3.

In one structurally advantageous embodiment, the pump 11 is a main pump for the water routing system in the washing machine 2. The mixing apparatus 1 thus does not require a separate, additional pump, but when installed in the washing machine 2 instead makes use of the pump 10 already present in the washing machine 2. This applies in particular when the mixing apparatus 1 is installed in a lower part of the washing machine 2 below a drum 18.

In one advantageous implementation, the pump 11 is an auxiliary pump for the mixing circuit MKL of the mixing apparatus 1. The pump 11 of the mixing apparatus 1 is a separate, additional pump to the pump 10 already present in the washing machine 2. This applies in particular when the mixing apparatus 1 is installed in an upper part of the washing machine 2 above a drum 18, wherein the washing machine 2 has a further main pump 10 for the water routing system in the washing machine 2.

In advantageous embodiments, the pump 11 is set up to change the direction of flow FR in the mixing circuit MKL.

Figure 3:
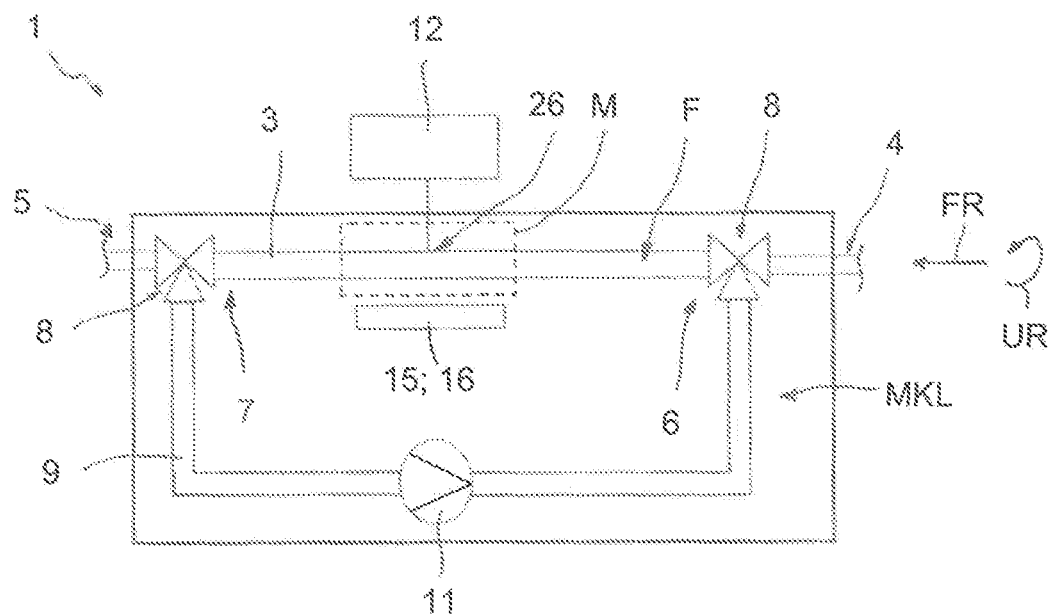
FIG. 3 is a schematic front view of a mixing apparatus according to the invention with a main line which has a three-way valve at the beginning and at the end and is connected to a secondary line in which a pump is provided.
Figure 4:
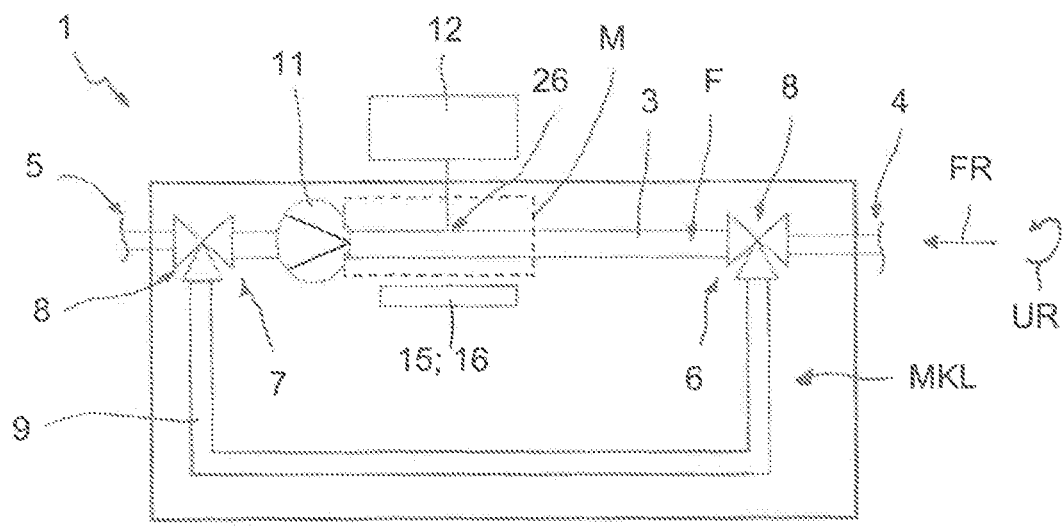
FIG. 4 is a schematic view of a mixing apparatus according to FIG. 3, wherein the pump is provided in the main line.
Figure 5:
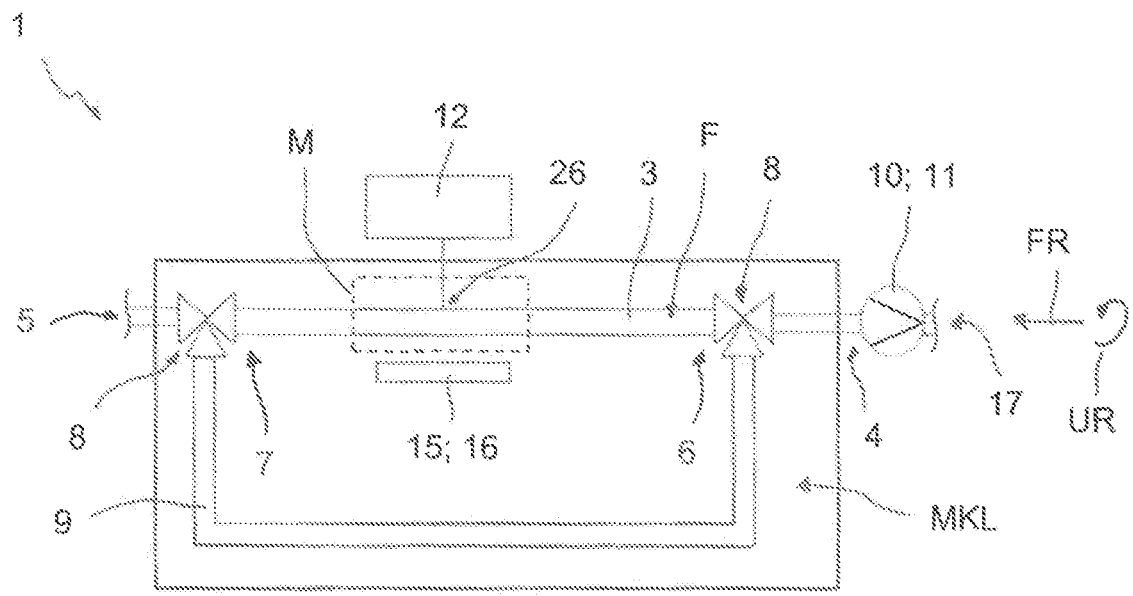
FIG. 5 is a schematic view of a mixing apparatus according to FIG. 3, wherein the mixing apparatus does not have an auxiliary pump but is fluidic ally connected to a main pump of the washing machine.

In one structurally advantageous embodiment, the mixing apparatus 1 has a heating and/or cooling means 15 for heating and cooling the liquid F in the main line 3. The heating and/or cooling means 15 further improves the intermixing and application of additives, in particular by adjusting the temperature in coordination with the temperature of the washing drum 18 or a washing program preset. The heating and/or cooling means 15 preferably has a Peltier element 16 and is located directly adjacent to the main line 3, as shown in FIGS. 3 to 5. In advantageous embodiments, the heating and/or cooling means 15 is located immediately adjacent to the additive inlet opening 6 for the supplied additive.

Figures 11, 12:
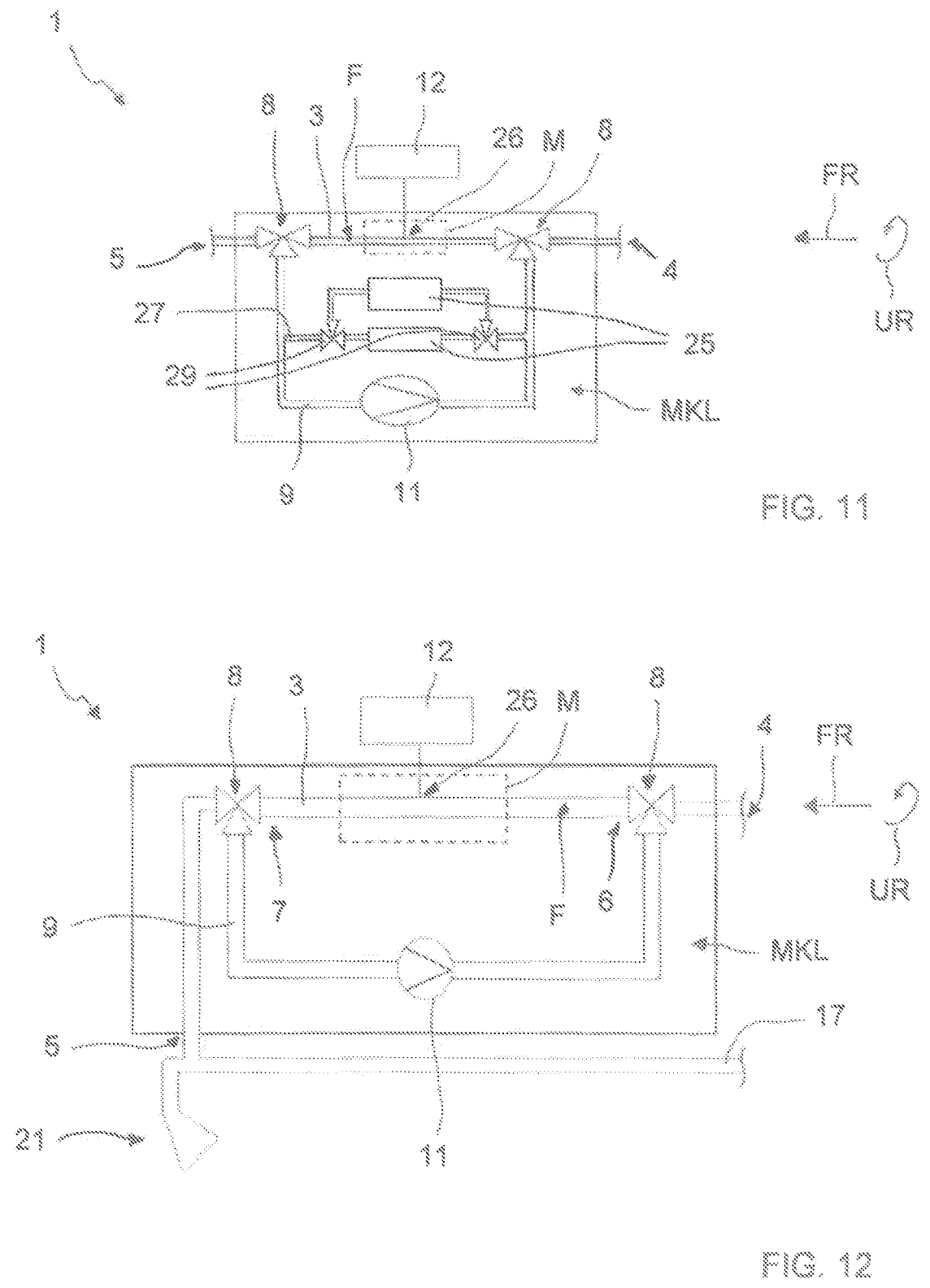

In one advantageous implementation, the mixing apparatus 1 has at least one additional liquid tank 25. The at least one additional liquid tank 25 can be connected to and disconnected from the mixing circuit MKL via at least one valve 29. The at least one additional liquid tank 25 is preferably in a further line 27 parallel to the main line 3 and the secondary line 9. If there are a plurality of additional liquid tanks 25, they can be connected and disconnected independently of one another. A total volume of the mixing circuit MKL may be from 0.051 to 21, preferably from 0.21 to 11. In the embodiment shown according to FIG. 11, the mixing apparatus 1 has two additional liquid tanks 25. In embodiments which are not shown, the mixing apparatus 1 may have just one or more than two additional liquid tanks 25.

The method according to the invention for intermixing an additive with a liquid F is carried out with the above-described mixing apparatus 1 according to the invention and/or with the above-described washing machine 2 according to the invention.

In one advantageous implementation, the liquid F with at least one added additive is pumped repeatedly through the mixing circuit MKL. The mixing circuit MKL is preferably self-contained, i.e., the inlet 4 and outlet 5 of the main line 3 are shut off. In the event of repeated passes, intermixing of the liquid F with the supplied additives can be assisted. In addition, the direction of flow FR of the liquid F in the mixing circuit MKL can be reversed during the mixing process.

In advantageous embodiments, the liquid F mixed with additive is increased in volume by at least one additional liquid tank 25. The additional liquid F from the at least one additional liquid tank 25 is mixed with additive in the mixing circuit MKL. All the liquid F present in the mixing circuit MKL and intermixed with additive is then introduced into the drum 18.

In one advantageous embodiment, a temperature in the mixing circuit MKL is adjusted by way of the above-described heating and/or cooling means 15 to a temperature appropriate to the particular additives. The temperature in the mixing circuit MKL is preferably monitored by way of a temperature sensor which is not shown in the figures. In preferred embodiments, the temperature sensor is arranged on the pump 11 or close to the additive inlet opening 26.

As is clear from the exemplary embodiments shown and the further ones mentioned above, the invention provides a mixing apparatus, a washing machine and a method which offer advantages over conventional apparatuses or methods in particular in terms of structure, automation, washing performance, functionality and/or resource efficiency.

The invention claimed is:

1. A mixing apparatus for intermixing an additive with a liquid in a washing machine, said washing machine having:
 a main line having a first end and a separate second end, wherein liquid flows in the main line along a direction of flow from the first end to the second end, wherein said main line has an inlet and an outlet for discharging said liquid flowing through said main line, and wherein a first three-way valve is positioned at the first end of the main line and a second three-way valve is positioned at the second end of the main line,
 a secondary line connected via said first and second three-way valves to said main line to form a mixing circuit,
 a pump for pumping said liquid through portions of said main line and said secondary line contained within said mixing circuit,
 at least one additive inlet opening provided on said main line for adding an additive into a mixing zone of said main line, and
 at least one swirling means in said main line.

2. The mixing apparatus as claimed in claim 1, wherein said at least one swirling means is arranged between said at least one additive inlet opening and said pump.

3. The mixing apparatus as claimed in claim 2, wherein said at least one swirling means is arranged in said mixing zone.

4. The mixing apparatus as claimed in claim 1, wherein a distance between said at least one additive inlet opening and said at least one swirling means is less than 5 cm.

5. The mixing apparatus as claimed in claim 1, wherein said at least one swirling means is a change in an internal diameter and/or a flow cross-sectional area of said main line.

6. The mixing apparatus as claimed in claim 5, wherein said flow cross-sectional area becomes larger along a direction of flow and then smaller again.

7. The mixing apparatus as claimed in claim 4, wherein a plurality of changes in said internal diameter and/or said flow cross-sectional area of said main line are arranged one behind the other along said direction of flow.

8. The mixing apparatus as claimed in claim 1, wherein said at least one swirling means is a rotor which is arranged on a rotary shaft of said pump bearing a pump rotor or an impeller for driving said rotor.

9. The mixing apparatus as claimed in claim 1, wherein a plurality of additive inlet openings are arranged on said main line in said mixing zone, said inlet openings being arranged offset relative to one another in a circumferential direction or along said direction of flow.

10. The mixing apparatus as claimed in claim 1, wherein said mixing apparatus is connected to a fresh water line, wherein said fresh water line is located directly adjacent to said mixing circuit.

11. The mixing apparatus as claimed in claim 1, wherein said main line is modifiable in shape in said mixing zone and is deformable by way of actuators.

12. The mixing apparatus as claimed in claim 11, wherein said main line is a flexible hose and said actuators are configured to bend said main line or to modify a cross-section of said main line.

13. The mixing apparatus as claimed in claim 1, wherein said pump is a main pump for said water routing system in said washing machine when said mixing apparatus is installed in a lower part of said washing machine below a drum.

14. The mixing apparatus as claimed in claim 1, wherein said pump is an auxiliary pump for said mixing circuit of said mixing apparatus when said mixing apparatus is installed in an upper part of said washing machine above a drum, wherein said washing machine has a further main pump for said water routing system in said washing machine.

15. The mixing apparatus as claimed in claim 11, wherein said pump is set up to change said direction of flow in said mixing circuit.

16. The mixing apparatus as claimed in claim 1, wherein said mixing apparatus has a heating and/or cooling means for heating and cooling said liquid in said main line.

17. The mixing apparatus as claimed in claim 16, wherein said heating and/or cooling means have a Peltier element and are located directly adjacent to said main line.

18. The mixing apparatus as claimed in claim 1, wherein said mixing apparatus has at least one additional liquid tank which can be connected to and disconnected from said mixing circuit via at least one valve.

19. A washing machine having:
- a rotatable drum with a water-permeable wall together with a drum drive for rotating it,
- a drum receptacle in which said drum is arranged, wherein said drum receptacle encloses said drum,
- a feeding apparatus for introducing water into said drum onto laundry located therein,
- a pump and water lines for pumping water to said feeding apparatus,
- a heating means for heating water, wherein said heating means is connected to said pump in fluid-conducting manner,
- a dispensing apparatus for adding additives,
- the mixing apparatus as claimed in claim 1, wherein said mixing apparatus is fluidically connected between said pump and said feeding apparatus, and
- a washing machine controller connected to said pump, said heating means and said drum drive as well as to said mixing apparatus and said dispensing apparatus.

20. The washing machine as claimed in claim 19, wherein said mixing apparatus is arranged in an upper part of said washing machine above said drum, wherein said mixing apparatus is connected to a DC power supply.

21. The washing machine as claimed in claim 19, wherein said mixing apparatus is arranged in a lower part of said washing machine below said drum, wherein said mixing apparatus is connected to an AC power supply.

22. A method for intermixing an additive with a liquid, the method comprising the steps of:
- providing the mixing apparatus as claimed in claim 1; and
- pumping said liquid with said intermixed additive repeatedly through said self-contained mixing circuit.

23. The method as claimed in claim 22, wherein said liquid mixed with additive is increased in volume by at least one additional liquid tank, wherein said additional liquid from said at least one additional liquid tank is mixed with said additive in said mixing circuit and then all said liquid present in said mixing circuit and mixed with said additive is introduced into said drum.

24. The method as claimed in claim 22, wherein a temperature in said mixing circuit is adjusted by way of heating and/or cooling means to a temperature appropriate to said particular additives, wherein said temperature in said mixing circuit is monitored by way of a temperature sensor.

* * * * *